United States Patent
Larson

(10) Patent No.: US 9,435,381 B2
(45) Date of Patent: Sep. 6, 2016

(54) SLEEVE WITH INTERIOR SPLINE BROACHING SYSTEM

(71) Applicant: BorgWarner Inc., Auburn Hills, MI (US)

(72) Inventor: Craig S. Larson, Schaumburg, IL (US)

(73) Assignee: BorgWarner Inc., Auburn Hills, MI (US)

( * ) Notice: Subject to any disclaimer, the term of this patent is extended or adjusted under 35 U.S.C. 154(b) by 137 days.

(21) Appl. No.: 14/324,433

(22) Filed: Jul. 7, 2014

(65) Prior Publication Data

US 2015/0016873 A1    Jan. 15, 2015

Related U.S. Application Data

(60) Provisional application No. 61/844,366, filed on Jul. 9, 2013.

(51) Int. Cl.

| F16D 1/072 | (2006.01) |
|---|---|
| F16D 1/027 | (2006.01) |
| F16D 1/10 | (2006.01) |

(52) U.S. Cl.
CPC ............... *F16D 1/027* (2013.01); *F16D 1/072* (2013.01); *F16D 1/10* (2013.01); *F16D 2001/103* (2013.01); *Y10T 29/49826* (2015.01); *Y10T 403/4966* (2015.01)

(58) Field of Classification Search
CPC ............. F16D 1/072; Y10T 403/4966; Y10T 403/4974
See application file for complete search history.

(56) References Cited

U.S. PATENT DOCUMENTS

| 2,511,298 | A | | 6/1950 | Schinnerer | |
|---|---|---|---|---|---|
| 4,269,550 | A | * | 5/1981 | DiGiulio | B23B 49/023 29/432 |
| 4,509,381 | A | * | 4/1985 | Ikemoto | F16H 3/16 29/525 |
| 4,571,111 | A | * | 2/1986 | Keogh | F16D 1/072 16/433 |
| 4,783,898 | A | * | 11/1988 | Kanamaru | B21D 53/88 29/522.1 |

(Continued)

FOREIGN PATENT DOCUMENTS

| DE | 89 15 215 U1 | 2/1990 |
|---|---|---|
| DE | 10 2007 000659 A1 | 5/2009 |

(Continued)

OTHER PUBLICATIONS

International Search Report for related European Application No. 14 17 6037; report dated Apr. 15, 2015.

*Primary Examiner* — Daniel Wiley
(74) *Attorney, Agent, or Firm* — Miller, Matthias & Huff LLP

(57) ABSTRACT

A metallic sleeve (20) may be pressed with relatively low axial forces onto a softer metallic shaft (12) to produce a permanent interference fit between the sleeve and the shaft even if subject to high torque loads. For this purpose, the sleeve incorporates a plurality of successively reduced diameter, axially spaced, arrays (52, 54, 56) of splines (50) within its interior, with a series of spaced circumferentially extending grooves (30, 32, 34) situated between the arrays. The arrays of splines define angled frontal cutting edges (60, 62, 64) adapted to cut into the metal shaft for rigid securement of sleeve to shaft. The spaced grooves are adapted to collect chip debris (36, 38, 40) during installation of the sleeve to the shaft, each groove providing a volumetric space to provide for the uniform distribution of chip debris within the interface of sleeve and shaft.

13 Claims, 2 Drawing Sheets

(56) References Cited

U.S. PATENT DOCUMENTS

| | | | | |
|---|---|---|---|---|
| 5,033,903 A * | 7/1991 | Olsson | B23P 11/00 | |
| | | | 29/525 | |
| 5,272,930 A * | 12/1993 | Nakamura | B21D 53/845 | |
| | | | 29/888.1 | |
| 5,632,684 A * | 5/1997 | Kumar | F16C 3/02 | |
| | | | 464/179 | |
| 5,716,156 A * | 2/1998 | Bayer | F16D 1/072 | |
| | | | 403/280 | |
| 5,829,135 A * | 11/1998 | Koneda | F16D 1/072 | |
| | | | 29/525 | |
| 6,951,150 B2 * | 10/2005 | Hedman | F16D 1/08 | |
| | | | 403/279 | |
| 7,387,462 B2 * | 6/2008 | Hacker | F16D 1/072 | |
| | | | 403/359.1 | |
| 8,020,299 B2 * | 9/2011 | Shirokoshi | F16D 1/072 | |
| | | | 29/520 | |
| 8,128,504 B2 * | 3/2012 | Fukumura | F16D 1/072 | |
| | | | 403/282 | |
| 2002/0041790 A1 * | 4/2002 | Suzuki | F16B 4/004 | |
| | | | 403/280 | |

FOREIGN PATENT DOCUMENTS

| | | | |
|---|---|---|---|
| DE | 10 2011 086574 A1 | 5/2013 | |
| EP | 2 119 929 A1 | 11/2009 | |
| FR | 2580341 A1 * | 10/1986 | B21K 25/00 |
| GB | 408 992 A | 4/1934 | |

\* cited by examiner

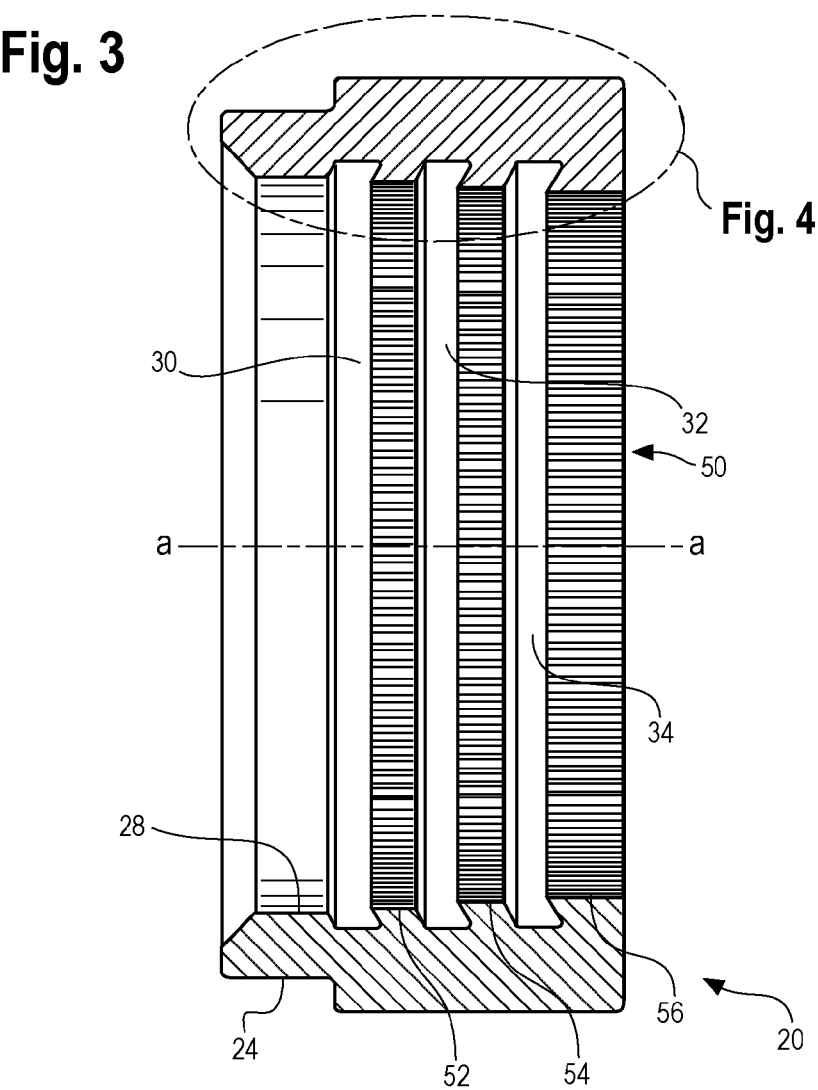
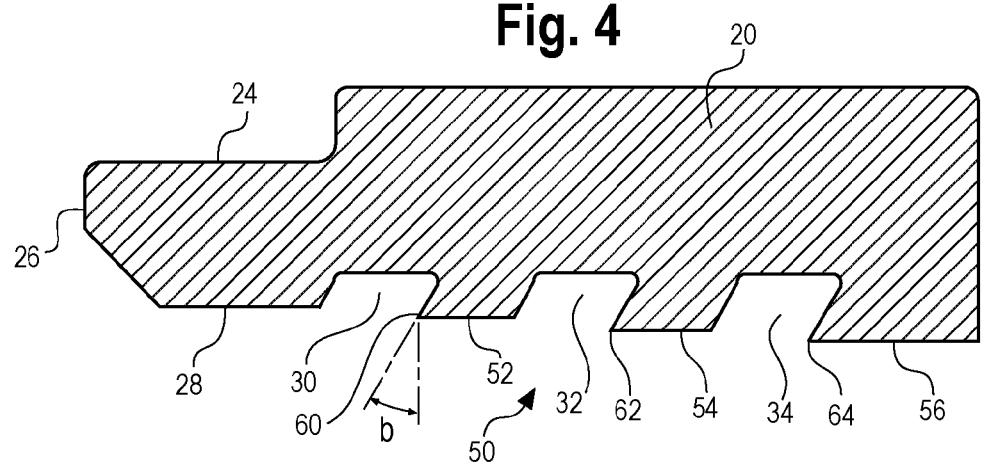

SLEEVE WITH INTERIOR SPLINE BROACHING SYSTEM

CROSS-REFERENCED TO RELATED APPLICATIONS

This is a non-provisional application based on, and claiming priority under 35 U.S.C. 119(e) to, U.S. Provisional Patent Application Ser. No. 61/844,366, filed on Jul. 9, 2013.

FIELD OF DISCLOSURE

The present disclosure relates generally to installation of a hardened metal sleeve onto a softer metal shaft for permanent coupling of sleeve and shaft parts subject to high torque loads. More particularly, the disclosure relates to a sleeve having an interior spline system that includes a series of stepped circumferential grooves adapted to assure securement of the sleeve to the shaft in a way to minimize risk of distortion of the exterior circumference of the sleeve.

BACKGROUND OF DISCLOSURE

To fixedly secure two components together as a single unit, and particularly when the components must be capable of supporting and transmitting significant torque loads, a permanent interference fit is often created between an interior diameter of one part and a corresponding exterior diameter of a mating part to create a secure and permanently rigid connection between component parts. In some instances the components are adapted to rotate together as a single unit.

The components, for example a metal sleeve and a metal shaft to which the sleeve is to be mated, may be provided such that the metal sleeve is formed of a harder metal, for example steel, than the metal of the shaft, as, for example, aluminum. In such cases, for example, a hardened steel sleeve may be formed with axially extending splines, while the aluminum shaft may have a smooth exterior surface adapted to receive the interiorly splined sleeve. In such cases, the interior diameter of the sleeve and respective exterior diameter of the shaft are closely sized to achieve desired interference.

Those skilled in the art will appreciate that the hardened metal splines of the sleeve are adapted to cut into the softer metal exterior diameter of the shaft to create an interference fit. During actual assembly of the two parts, the splines of the sleeve will generate chip debris as the splines cut into the softer metal exterior of the shaft. To accommodate the chip debris, the axially extending splines of the sleeve may be intersected by a circumferential groove adapted to receive the chips, as well as to provide at least one cutting-edge for cutting into the shaft. The latter action generates the chip debris.

The particular groove design as conventionally employed may give rise to distortion of the outside geometry and/or shape of the outer component, i.e. the sleeve, due to inability of the sleeve to accommodate chip debris along a substantial portion of the interference fit between the parts. Such lack of means to accommodate chip debris may create actual distortion of the sleeve, which may be particularly undesirable in situations where such distortion may impact critical exterior sleeve tolerances.

SUMMARY OF DISCLOSURE

In accordance with one aspect of the disclosure, a metallic sleeve adapted to be mated to a softer metallic shaft may comprise an inner race for an automatic transmission. The metallic shaft may comprise a front support shaft of the transmission, and the inner race component may be pressed onto the front support shaft to produce an interference fit between the inner race and the shaft; i.e. the sleeve and the shaft.

In accordance with another aspect of the disclosure, the metallic sleeve may incorporate an interior series of successively reduced diameter splined portions that interface with a series of circumferential grooves adapted to collect chip debris during installation of the sleeve onto the shaft.

In accordance with yet another aspect of the disclosure, each spline serration may have an angled frontal cutting edge with an angle in a range of 5 to 10 degrees.

In accordance with yet another aspect of the disclosure, each spline serration may have an angled frontal cutting edge with an angle in a range of 10 to 30 degrees.

In accordance with yet another aspect of the disclosure, at least two axially aligned and spaced circumferential grooves within the interior diameter of the sleeve are adapted to collect chip debris during installation of the sleeve onto the shaft.

In accordance with yet another aspect of the disclosure, three or more axially aligned and spaced circumferential grooves within the interior diameter of the sleeve are adapted to reduce amount of chip debris associated with any one of the successively reduced diameter splined portions and to spread chip debris collection over a greater axial length of the interference between sleeve and shaft components.

In accordance with yet another aspect of the disclosure, the radial cutting angle of the spline serration is effective to reduce distortion of the sleeve.

Finally, in accordance with a still further aspect of the disclosure, three or more axially spaced circumferential grooves within the interior diameter of the sleeve are adapted to reduce amount of axial force required to assemble the sleeve to the shaft.

These and other aspects and features of the present disclosure may be better appreciated by reference to the following detailed description and accompanying drawings.

BRIEF DESCRIPTION OF DRAWINGS

FIG. 3 is a cross-sectional view of the sleeve component of FIG. 2.

FIG. 4 is an encircled portion of FIG. 3, enlarged for clarity.

It should be understood that the drawings are not to scale, and that the disclosed embodiments are illustrated only diagrammatically and in partial views. It should also be understood that this disclosure is not limited to the particular embodiments illustrated herein.

DETAILED DESCRIPTION

Figure 1:
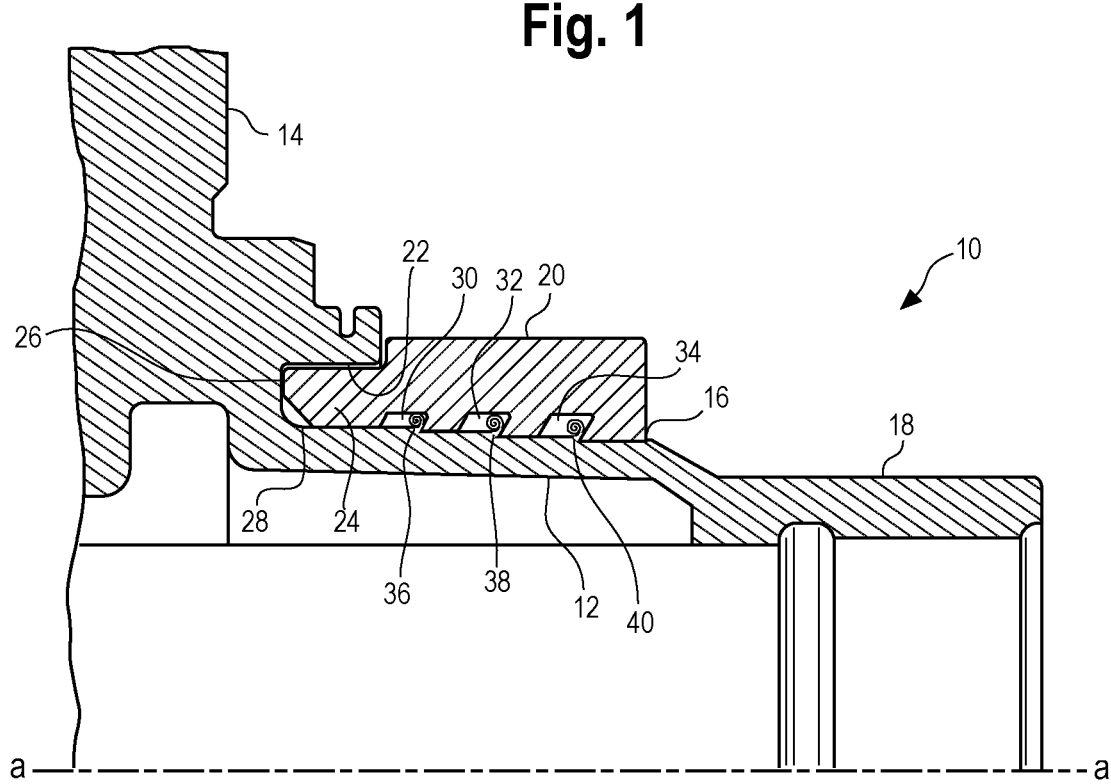
FIG. 1 is a cross-sectional view of a front support wall assembly of an automatic transmission.

Referring to FIG. 1, a metal sleeve securement system 10, also variously referenced herein as an interior spline broaching system, may be described in the context of a hollow shaft 12 extending from a front support wall 14 of a transmission (not shown). In the described embodiment, the vertical front support wall 14 physically supports the shaft 12, which as disclosed herein is integral to the support wall 14 and is a nonrotating component extending along an axis "a-a".

The shaft 12 includes an exterior circumference 16, and includes reduced diameter portions 18 in the embodiment disclosed. Alternatively, the reduced diameter portions 18 may be enlarged diameter portions. A transmission inner race, depicted as a sleeve 20, is provided as the innermost part of a clutch assembly (not shown).

The vertical transmission wall 14 includes a bore 22 adapted to receive an exteriorly reduced diameter pilot portion 24 of the sleeve 20. For this purpose, a nose end 26 of the pilot portion 24 is adapted to be first received over the exterior circumference 16 of the shaft 12. For purposes of installation, those skilled in the art will appreciate that the interior diameter 28 of the pilot portion 24 will be the largest of several successively reduced, or stepped, diameters within the interior of the axially extending sleeve 20 to be described herein.

Figure 2:
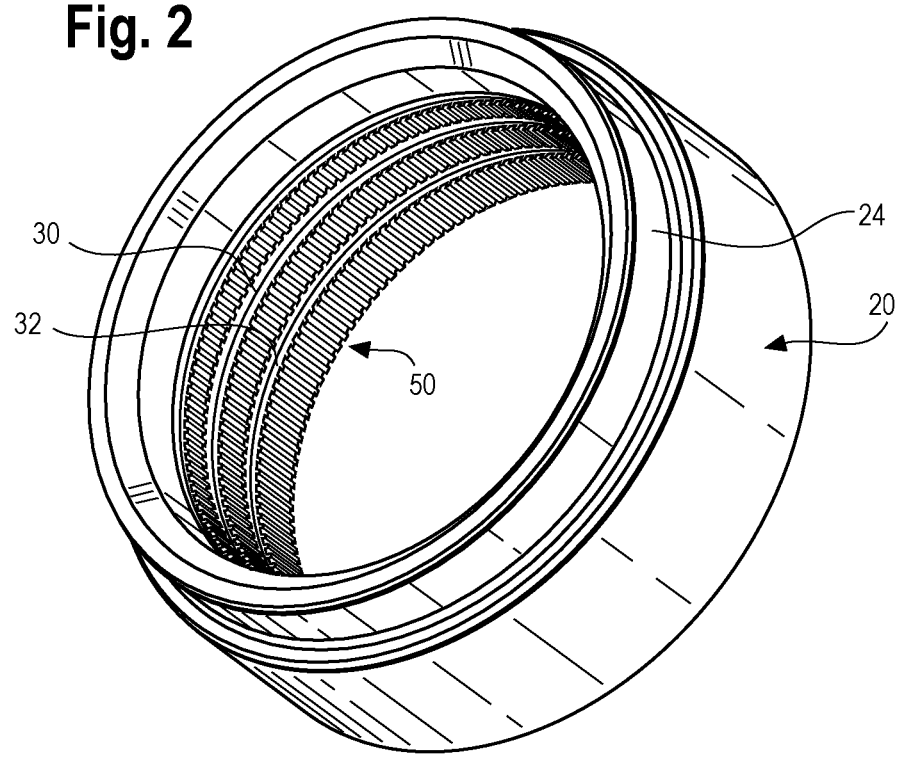
FIG. 2 is a perspective view of a sleeve component adapted to act as an inner race of a clutch member (not shown), fixedly splined to an axially extending non-rotatable support shaft of the front support wall of FIG. 1.

Referring now also to FIGS. 2 and 3, the interior structure of the sleeve 20 is revealed in detail. Circumferentially extending axially spaced grooves 30, 32, and 34 are adapted to provide an interior volumetric space for collection and containment of chip debris 36, 38, and 40, shown in FIG. 1, within the grooves 30, 32, and 34 as the sleeve 20 is inserted over the shaft 12 during assembly. As the sleeve is formed of a relatively hard metal, such as hardened steel, and the shaft is formed of a softer metal such as aluminum, the sleeve and shaft are sized to support a robust interference fit once the sleeve is installed onto the shaft.

The interior of the sleeve 20 contains a plurality of axially extending splines 50, interrupted by the grooves 30, 32, and 34, to define axially spaced first, second and third arrays 52, 54, and 56, respectively, of splines 50. Each array 52, 54, and 56 has a successively reduced diameter, from left to right as shown. As noted, the interior diameter 28 of the pilot portion 24, which is not splined, provides the largest interior diameter within the sleeve 20; i.e. even larger than the first array 52, which in turn is larger than the second array 54, which finally is in turn larger than the third array 56.

Referring now also to FIG. 4, for installation purposes a leading edge of each array 52, 54, and 56 of spines 50 is respectively defined by an angled frontal cutting edge 60, 62, 64. In the embodiment disclosed, each cutting edge 60, 62, 64 may have an angle B (depicted only at the cutting edge 60) adapted to enable cutting into the softer metal, e.g. aluminum, of the shaft 12 so as to avoid distortion of the sleeve. As such, a series of decreasing diameters of the splines in a multiple broaching-style cutting manner, as the sleeve 20 is installed over the shaft 12, may effectively reduce distortion otherwise realized during assembly. In addition, those skilled in the art will appreciate that an additional benefit will be that any given force required to install the sleeve onto the shaft may be reduced via utilization of structures described herein.

Continuing reference to FIG. 4, the angle B of the respective frontal cutting edges 60, 62, 64 is at least 5 to 10 degrees as measured from a radius or hypothetical vertical line extending through the axis a-a in the views depicted. A relatively shallow angle range may be effective with either the use of a relatively soft metal for the hollow shaft 12, such as a soft aluminum alloy, or use of a softer hardened metal sleeve 20. In any event, such low angle ranges would be suitable for relatively larger differentials in relative hardnesses of shaft 12 and sleeve 20.

Conversely, smaller differentials between the hardnesses of shaft 12 and sleeve 20 may require a greater angle B of the frontal cutting edges 60, 62, 64 to be effective. In some cases, such angle B may be considerably steeper, as for example within a range of 10 to 30 degrees to avoid galling of the shaft. In the latter instance, galling may otherwise occur with the greater forces required for installation of the sleeve 20 onto the shaft 12. The angle B may be increased to reduce such galling, so as to 1) minimize deleterious impacts on, and hence weakening of, the structural integrity of the shaft by undesirable cold working of the shaft surface, and 2) reduce amount of force required to install the sleeve onto the shaft.

Referring now to FIGS. 1 and 4, those skilled in the art will appreciate that as the sequential interior arrays 52, 54, 56 of splines 50 cut into the shaft 12, the installation forces applied to the sleeve 20 become lower as smaller amounts of material are removed at any given time, e.g. via the sequential cutting by arrays 52, 54, 56 of the splines 50. In contrast, if all the material were to be removed at once, the required installation forces could be substantial enough to create permanent sleeve distortion, depending on parameters of spline width and depth of cut. Hence, by shaving commensurately smaller amounts of metal from the shaft 12 using the disclosed cutting edges 60, 62, 64, respectively, of each of the arrays 52, 54, 56 as applied in sequential succession per the disclosure hereof, the installation forces can remain low, and distortion of the sleeve may be more easily prevented.

The configuration of the sleeve 20 should not be limited to only that as described herein. There may be numerous other configurations suitable for similar arrangements, even including rotary sleeves and shaft components, in accordance with this disclosure. For example, although the pilot portion 24 is not splined herein, it could conceivably be splined for reasons of manufacturing convenience, in spite of the lack of a functional need for such splines within the pilot portion 24. As such, the internal sleeve configurations described herein should not be construed as the only possible configurations covered by this disclosure.

Finally, a method of securing a hardened metal sleeve 20 to a relatively softer metal shaft 12 in accordance with this disclosure may include the steps of:

creating a metal sleeve broaching system to frictionally secure the metal sleeve onto the softer metal shaft by providing a sleeve having an axis, and forming arrays of axially extending splines within the interior of the sleeve, with each spline oriented radially inwardly toward the axis;

forming a plurality of axially spaced circumferential grooves in the interior of the sleeve to create circumferentially extending volumetric spaces between each of the arrays of interior splines to capture chip debris from the metal shaft;

wherein each of the arrays defines a plurality of frontal cutting edges, whereby the sleeve defines an interior spline broaching mechanism for achieving low axial forces to affix the sleeve to a shaft.

INDUSTRIAL APPLICABILITY

The metal sleeve securement system of this disclosure may be employed in a variety of applications, including but not limited to, automobiles, trucks, off-road vehicles, and other machines that may benefit from components that may be frictionally secured together.

The disclosed structure may offer unique approaches for avoiding part distortion, and particularly when using a sleeve under circumstances requiring that distortion of the sleeve is avoided.

What is claimed is:

1. A metal sleeve securement system (10) adapted to frictionally affix a metal sleeve (20) to a softer metal shaft (12), the securement system (10) comprising:
    a sleeve (20) having an axis, and having arrays (52, 54, 56) of axially extending interior splines (50), each spline oriented radially inwardly toward the axis;
    a shaft (12) formed of a metal softer than the metal of the sleeve (20), the shaft having an axis adapted to be coaxial with the axis of the sleeve;
    the sleeve including a plurality of axially spaced interior circumferential grooves (30, 32, 34) defining circumferentially extending volumetric spaces between the arrays of interior splines, each of the arrays defining a plurality of frontal cutting edges (60, 62, 64), wherein the sleeve is configured to provide an interior spline broaching mechanism (10) for achieving low axial forces to affix the sleeve to the shaft, wherein each of the arrays (52, 54, 56) of splines (50) has a successively reduced diameter for successively cutting deeper into the shaft (12), as the sleeve (20) is axially inserted onto the shaft (12).

2. The metal sleeve securement system (10) of claim 1, wherein each of the frontal cutting edges (60, 62, 64) defines an angled surface extending generally orthogonally to the axis, the angle being greater than a five degree angle with respect to an interior radius of the sleeve (20).

3. The metal sleeve securement system (10) of claim 1, wherein each groove (30, 32, 34) is adapted to accommodate chip debris (36, 38, 40) created by the cutting of the shaft.

4. The metal sleeve securement system (10) of claim 3, wherein the chip debris (36, 38, 40) is axially spread within the spaced grooves (30, 32, 34), and wherein upon securement, the grooves extend circumferentially between the shaft (12) and sleeve (20).

5. The metal sleeve securement system (10) of claim 1, wherein each of the frontal cutting edges (60, 62, 64) makes at least a 10 degree angle with respect to an interior radius of the sleeve (20).

6. The metal sleeve securement system (10) of claim 1, wherein the spaced arrays (52, 54, 56) of splines (50) and the frontal cutting edges (60, 62, 64) provide an interior spline broaching system within the sleeve (20).

7. A metal sleeve (20) adapted for frictional securement to a softer metal shaft (12), comprising:
    the sleeve (20) having an axis, and having arrays (52, 54, 56) of axially extending interior splines (50), each spline oriented radially inwardly toward the axis;
    a plurality of axially spaced circumferential grooves (30, 32, 34) defining circumferentially extending volumetric spaces between each set of interior splines, each array defining a plurality of frontal cutting edges (60, 62, 64), wherein the sleeve (20) defines an interior spline broaching mechanism for achieving low axial forces to affix the sleeve to a shaft (12), wherein each array (52, 54, 56) of splines (50) has a successively reduced diameter for successively cutting deeper into the shaft (12), as the sleeve (20) is axially inserted onto the shaft (12).

8. The metal sleeve (20) of claim 7, wherein each of the frontal cutting edges (60, 62, 64) defines an angled surface extending generally orthogonally to the axis, the angle being greater than a five degree angle with respect to an interior radius of the sleeve (20).

9. The metal sleeve (20) of claim 7, wherein each groove (30, 32, 34) is adapted to accommodate chip debris (36, 38, 40) created by the cutting of the shaft (12).

10. The metal sleeve (20) of claim 9, wherein the chip debris (36, 38, 40) is axially spread within the spaced grooves (30, 32, 34), and wherein upon securement, the grooves extend circumferentially between the shaft (12) and sleeve (20).

11. The metal sleeve (20) of claim 7, wherein each of the frontal cutting edges (60, 62, 64) makes at least a 10 degree angle with respect to an interior radius of the sleeve (20).

12. The metal sleeve (20) of claim 7, wherein the spaced arrays (52, 54, 56) of splines (50) and the frontal cutting edges (60, 62, 64) provide an interior spline broaching system (10) within the sleeve (20).

13. A method of securing a hardened metal sleeve (20) to a relatively softer metal shaft (12), comprising the steps of:
    creating a metal sleeve broaching system (10) to frictionally secure the metal sleeve (20) onto the softer metal shaft (12) by providing a sleeve (20) having an axis, and forming arrays (52, 54, 56) of axially extending splines (50) in the interior of the sleeve (20), with each spline (50) oriented radially inwardly toward the axis;
    forming a plurality of axially spaced circumferential grooves (30, 32, 34) in the interior of the sleeve to create circumferentially extending volumetric spaces between each of the arrays of interior splines to capture chip debris (36, 38, 40) from the metal shaft, wherein each of the arrays defines a plurality of frontal cutting edges (60, 62, 64), wherein each of the arrays (52, 54, 56) of splines (50) has a successively reduced diameter for successively cutting deeper into the shaft (12), as the sleeve (20) is axially inserted onto the shaft (12), whereby the sleeve defines an interior spline broaching mechanism (10) for achieving low axial forces to affix the sleeve (20) to a shaft (12).

* * * * *